United States Patent
Hatanaka et al.

(10) Patent No.: US 7,420,363 B2
(45) Date of Patent: Sep. 2, 2008

(54) ROTATION ANGLE DETECTION APPARATUS ENABLING MEASUREMENT OF DEGREE OF ROTATION OF A SHAFT THAT EXCEEDS 360°

(75) Inventors: Shinji Hatanaka, Okazaki (JP); Kenji Takeda, Okazaki (JP); Shigetoshi Fukaya, Toyota (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 11/797,424

(22) Filed: May 3, 2007

(65) Prior Publication Data

US 2007/0268015 A1   Nov. 22, 2007

(30) Foreign Application Priority Data

May 16, 2006   (JP)   ............................. 2006-136562

(51) Int. Cl.
    *G01B 7/30*   (2006.01)
(52) U.S. Cl. ................................. 324/207.25
(58) Field of Classification Search ............. 324/270.25
    See application file for complete search history.

(56) References Cited

U.S. PATENT DOCUMENTS

| 6,630,823 B2 | 10/2003 | Tateishi et al. |
| 6,894,487 B2 | 5/2005 | Kunz-Vizenetz |
| 2005/0028614 A1 | 2/2005 | Saito |

FOREIGN PATENT DOCUMENTS

| JP | 2002-213910 | 7/2002 |
| JP | 2004-53444 | 2/2004 |
| JP | 2005-55297 | 3/2005 |

*Primary Examiner*—Reena Aurora
(74) *Attorney, Agent, or Firm*—Nixon & Vanderhye PC

(57) ABSTRACT

A rotation angle of a shaft is detected based on changes in levels of magnetic flux from a single magnet that is mounted on the shaft and is moved axially in accordance with rotation of the shaft. Respective detected variations in level of X-direction and Y-direction magnetic flux components (each at right angles to the shaft axis) are used to obtain a first quantity that varies monotonically, and a second quantity that varies periodically, in accordance with increased rotation angle. An accurate value of the shaft rotation angle is calculated based on the first and second quantities, in combination.

14 Claims, 9 Drawing Sheets

FIRST CALCULATION QUANTITY $\theta 1 = \sqrt{(Bx^2 + By^2)} = f(\theta_i)$

SECOND CALCULATION QUANTITY $\theta 2 = \arctan(By / Bx)$

FIRST CALCULATION QUANTITY $\theta_1 = \sqrt{(Bx^2 + By^2)} = f(\theta_i)$

SECOND CALCULATION QUANTITY $\theta_2 = \arctan(By / Bx)$

FIG. 5

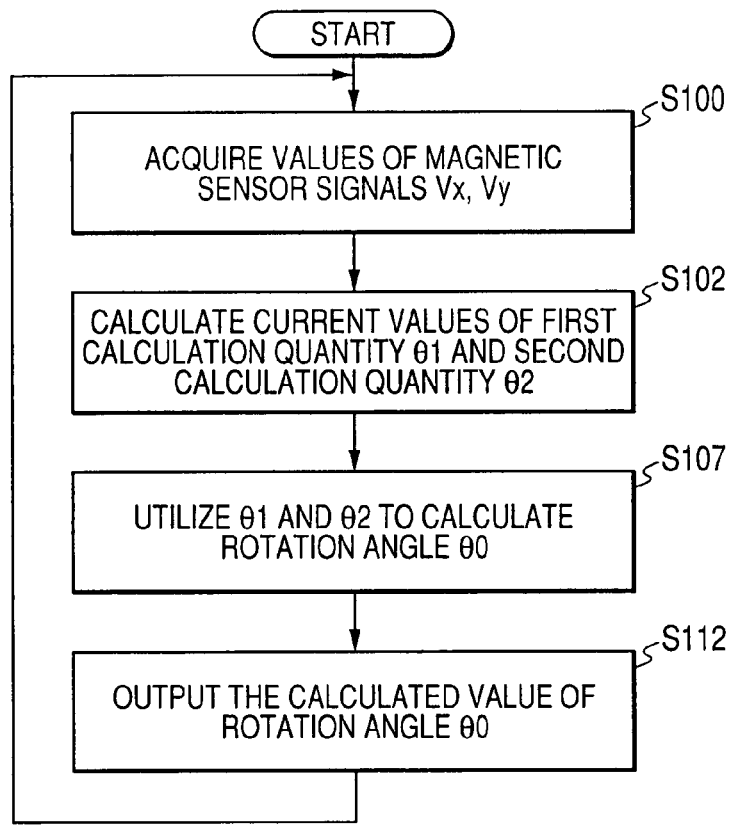

```
              START
                │
                ▼
    ┌─────────────────────────┐
    │ ACQUIRE VALUES OF MAGNETIC │ ─── S100
    │   SENSOR SIGNALS Vx, Vy    │
    └─────────────────────────┘
                │
                ▼
    ┌─────────────────────────────────┐
    │ CALCULATE CURRENT VALUES OF FIRST │ ─── S102
    │ CALCULATION QUANTITY θ1 AND SECOND│
    │     CALCULATION QUANTITY θ2       │
    └─────────────────────────────────┘
                │
                ▼
    ┌─────────────────────────┐
    │  UTILIZE θ1 AND θ2 TO CALCULATE │ ─── S107
    │      ROTATION ANGLE θ0          │
    └─────────────────────────┘
                │
                ▼
    ┌─────────────────────────┐
    │ OUTPUT THE CALCULATED VALUE OF │ ─── S112
    │       ROTATION ANGLE θ0        │
    └─────────────────────────┘
```

FIG. 6

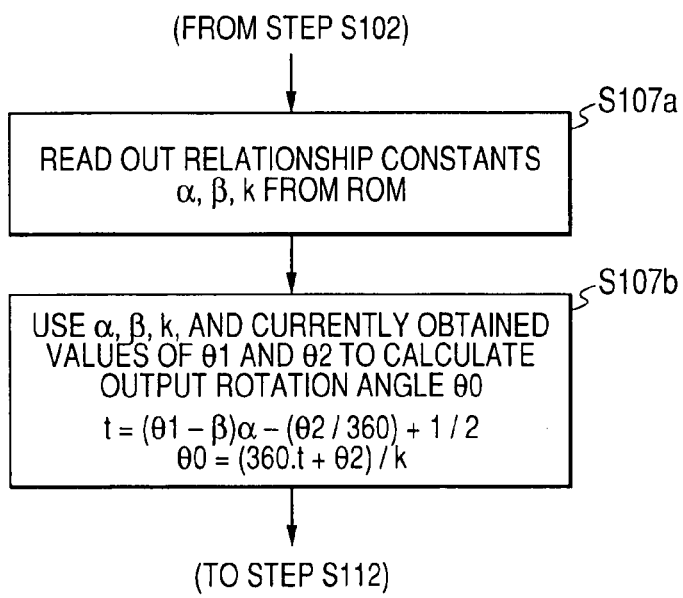

(FROM STEP S102)

S107a: READ OUT RELATIONSHIP CONSTANTS α, β, k FROM ROM

S107b: USE α, β, k, AND CURRENTLY OBTAINED VALUES OF θ1 AND θ2 TO CALCULATE OUTPUT ROTATION ANGLE θ0

$$t = (\theta 1 - \beta)\alpha - (\theta 2 / 360) + 1/2$$
$$\theta 0 = (360 \cdot t + \theta 2)/k$$

(TO STEP S112)

FIG. 8A (FROM STEP S108)

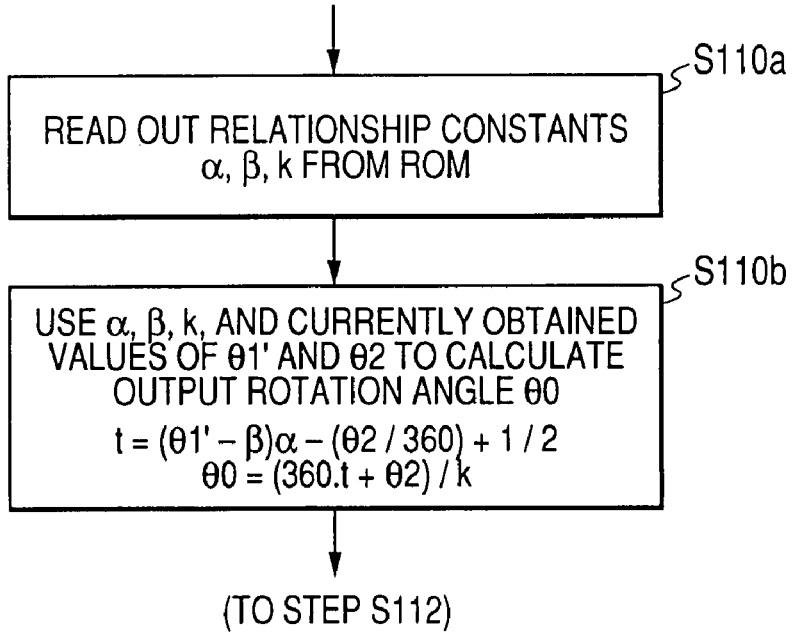

S110a: READ OUT RELATIONSHIP CONSTANTS $\alpha, \beta, k$ FROM ROM

S110b: USE $\alpha, \beta, k$, AND CURRENTLY OBTAINED VALUES OF $\theta_1'$ AND $\theta_2$ TO CALCULATE OUTPUT ROTATION ANGLE $\theta_0$
$$t = (\theta_1' - \beta)\alpha - (\theta_2 / 360) + 1/2$$
$$\theta_0 = (360 \cdot t + \theta_2) / k$$

(TO STEP S112)

FIG. 8B (FROM STEP S112)

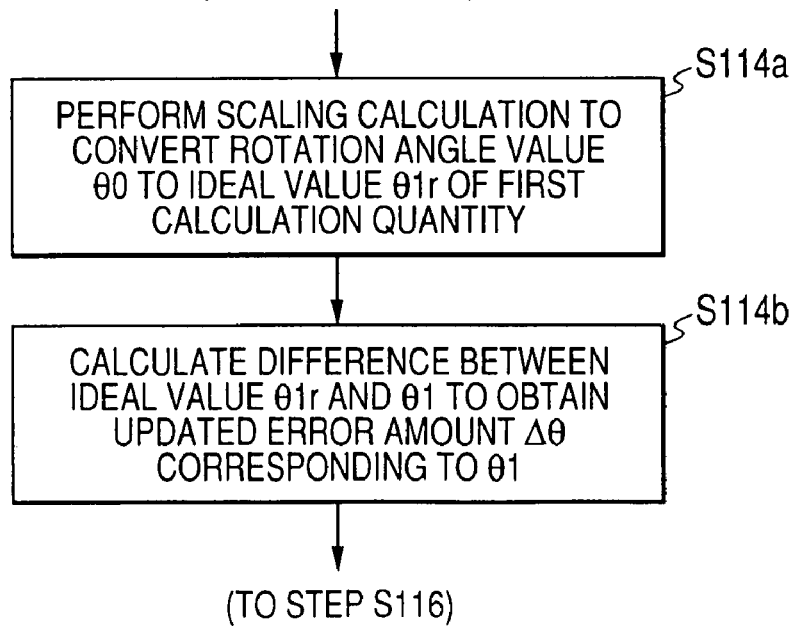

S114a: PERFORM SCALING CALCULATION TO CONVERT ROTATION ANGLE VALUE $\theta_0$ TO IDEAL VALUE $\theta_{1r}$ OF FIRST CALCULATION QUANTITY S114b: CALCULATE DIFFERENCE BETWEEN IDEAL VALUE $\theta_{1r}$ AND $\theta_1$ TO OBTAIN UPDATED ERROR AMOUNT $\Delta\theta$ CORRESPONDING TO $\theta_1$ (TO STEP S116)

ROTATION ANGLE DETECTION APPARATUS ENABLING MEASUREMENT OF DEGREE OF ROTATION OF A SHAFT THAT EXCEEDS 360°

CROSS-REFERENCE TO RELATED APPLICATIONS

This application is based on and incorporates herein by reference Japanese Patent First Application No. 2006-136562 filed on May 16, 2006.

BACKGROUND OF THE INVENTION

1. Field of Application

The present invention relates to a rotation angle detection apparatus that detects a degree of rotation of a rotary shaft from a reference angular position. In particular, the invention relates to a rotation angle detection apparatus which incorporates a magnet and in which the degree of rotation is detected based on changes in detected levels of magnetic flux.

2. Description of Related Art

Types of rotation angle detection apparatus are known in the prior art, which detect changes in rotation angle of magnets by utilizing magnetic sensors, and thereby detect amounts of change in rotation angle of a rotary shaft. A rotary shaft whose angular position is to be detected by such an apparatus will be referred to as the "output rotary shaft". A type of rotation angle detection apparatus that enables detection of amounts of rotation angle (from a reference angular position) that exceed 360° has been described for example in Japanese patent publication number 2002-213910 (referred to in the following as reference document 1). Such a type of rotation angle detection apparatus will be designated in the following as an "over-360° rotation angle detection apparatus" in the following.

With the over-360° rotation angle detection apparatus described in reference document 1, two shafts carrying respective magnets engage respectively independently with an output rotary shaft (i.e., whose angular position is to be measured), and the respective rotation angles of the two magnet shafts are detected by corresponding magnetic sensors. Two rotation angle detection signals are thereby produced by these magnetic sensor, With the apparatus of reference document 1, a first one of the rotation angle detection signals is a signal that varies monotonically over an entire range of measurement of the angular positions of the output rotary shaft. The second rotation angle detection signal varies in a periodic manner (i.e. successively changing by increasing from a minimum value to a maximum value) as the rotation angle of the output rotary shaft is successively increased throughout the measurement range, with a plurality of variation periods of the second rotation angle detection signal occurring over the measurement range.

Calculations are performed on the respective rotation angle detection signals from the two magnetic sensors, to obtain values of amounts of rotation of the output rotary shaft that exceed 360°.

However such a type of rotation angle detection apparatus is known to exhibit a lowering of detection accuracy as a result of the effects of temperature variations and of long-term usage. For that reason it has been proposed in Japanese patent publication number 2005-55297 (referred to in the following as reference document 2) to utilize a temperature detector to apply temperature compensation to a rotation angle detection apparatus of the type described in reference document 1. In addition it has been proposed in Japanese patent publication number 2004-53444 (referred to in the following as reference document 3) to store information beforehand, for the purpose of applying compensation for the effects of long-term usage to a rotation angle detection apparatus of the type described in reference document 1.

However such types of prior art rotation angle detection apparatus require the addition of temperature sensor elements (in the case of methods which apply temperature compensation), thereby increasing the overall cost of such an apparatus. In the case of an apparatus in which compensation is applied for the effects of long-term variations, actual changes in component characteristics as a result of long-term usage may vary substantially from predicted changes, due to the effects of manufacturing variations in the component characteristics, etc.

Hence, such prior art types of apparatus have the disadvantage of unreliability with respect to long-terminal accuracy of measurement. In addition, they require the use of a plurality of magnets and a mechanism which drives the magnets respectively separately for rotation, and so have the disadvantage of a relatively complex configuration, resulting in further increases in manufacturing costs.

SUMMARY OF THE INVENTION

It is an objective of the present invention to overcome the above problems of the prior art, by providing a rotation angle detection apparatus which is capable of detecting amounts of rotation angle greater than 360° and whose detection of accuracy is not substantially affected by variations in operating temperature or by long-term changes in component characteristics.

It is a further objective to provide a rotation angle detection apparatus which utilizes sensing of magnetic flux for rotation detection, implemented by using only a single magnet, and so having a simpler configuration than has been possible with prior art types of apparatus.

The invention provides a rotation angle detection apparatus wherein a first calculation amount is derived which varies monotonically in accordance with the rotation angle of a rotary shaft (i.e., angular displacement from a reference position) within a specific range of angular values, with values of the first calculation amount and the rotation angle being related in accordance with a predetermined relationship, and a second calculation amount is derived which varies periodically in accordance with the rotation of the rotary shaft (i.e., increases from a maximum to a minimum value one or more times, during one complete rotation of the rotary shaft). The invention utilizes the fact that if the maximum amount of error in the first calculation amount is less than a predetermined maximum extent (within the predetermined range of angular values), the rotation angle can be accurately calculated based upon values obtained for the first calculation amount and second calculation amount, irrespective of the error in the first calculation amount.

The term "amount of error in the first calculation amount", as used herein signifies a difference between an ideal value of the first calculation amount (i.e. a value which is accurately related to the rotation angle by the predetermined relationship) and the actually obtained value of the first calculation amount.

The apparatus preferably utilizes sensors that detect levels of magnetic flux produced from a magnet, with relative rotary motion and relative axial motion being produced between the magnet and the sensors in accordance with rotation of the rotary shaft. Values of the first calculation amount are obtained based on variations in level of the sensor signals resulting from the relative axial motion, and values of the first calculation amount are obtained based on variations in level of the sensor signals resulting from the relative rotary motion.

From a first aspect of the invention, it is ensured that (prior to commencing operation of the apparatus) the maximum amount of error in the first calculation amount is less than the aforementioned predetermined maximum extent, for all values within the aforementioned predetermined range, and measurement of the rotation angle is performed by calculation using values obtained for the first calculation amount and the second calculation amount in conjunction with the predetermined relationship.

More specifically, according to the first aspect, the invention provides rotation angle detection apparatus for deriving a current value of shaft rotation angle of a rotary shaft within a range which exceeds 360°, wherein designating the shaft rotation angle as θ, the apparatus comprises means for deriving:

(a) a first calculation amount as a function f(θ) which varies monotonically throughout a range of values of the shaft rotation angle θ that exceeds 360°, and (b) a second calculation amount which varies periodically between a minimum and a maximum value in accordance with variation of the shaft rotation angle, with a predetermined integral number of variation periods of the second calculation amount occurring within a variation range of 360° of the shaft rotation angle.

In addition, the apparatus comprises processing circuitry for operating on respective current values of the first calculation amount and the second calculation amount, to calculate a current value of the shaft rotation angle θ, with the apparatus being configured such that the absolute magnitude of error amount in the first calculation amount is no greater than a predetermined allowable value.

Preferably, the allowable value is one half of an amount of change in the first calculation amount that corresponds to one variation period of the second calculation amount.

From a second aspect, the invention provides as rotation angle detection apparatus whereby it is ensured that (subsequent to commencing operation of the apparatus) even if the maximum amount of error in the first calculation amount comes to exceed the aforementioned predetermined maximum extent, accurate calculation of values of the rotation angle of the rotary shaft can continue to be achieved.

Essentially, this is achieved by:

(1) ensuring that the amount of error is below the above-mentioned maximum extent, for each of the values of the first calculation amount respectively corresponding to rotation angle values, before the apparatus is initially put into operation, and subsequently, (2) each time that values of the first calculation amount and second calculation amount are obtained, for use in deriving a current value of the rotation angle, a previously derived amount of error corresponding to that value of the first calculation amount is read out from a rewritable non-volatile memory and is used to obtain a compensated value of the first calculation amount, with that compensated value being used in conjunction with the second calculation amount to calculate the rotation angle, (3) the calculated rotation angle is converted to an equivalent value of the first calculation amount by using the aforementioned relationship (i.e., to obtain an ideal value of the first calculation amount), which is then used to calculate an updated value for the aforementioned corresponding error amount, and (4) the updated corresponding error amount is stored in the rewritable non-volatile memory, replacing the previously stored corresponding error amount.

In that way, the error amounts corresponding to each of the possible values of the first calculation amount are successively updated throughout the operating life of the apparatus, and used to compensate the corresponding calculation amount when calculating a rotation angle value. Thus, even if the error amount for any value of the first calculation amount should come to exceed the aforementioned maximum amount (e.g., due to long-term changes in characteristics of system components, etc.), it is reliably ensured that rotation angle values can continue to be accurately measured by the apparatus.

With preferred embodiments of the invention, the apparatus comprises a housing having the rotary shaft rotatably mounted therein, a magnet, and a pair of magnetic sensors, with either the magnet or the pair of magnetic sensors being attached for rotation with the rotary shaft and the other being fixedly attached with respect to the housing, and with the magnetic sensors being located upon the axis of rotation of the rotary shaft. The apparatus further includes a mechanism such as a screw mechanism, for producing relative linear motion between the magnet and the pair of magnetic sensors, with the motion directed along the axis of rotation and occurring in accordance with rotation of the rotary shaft. The magnet has an inner face having a circular circumference which is concentric with the axis of rotation and which successively increases in diameter throughout an axial distance corresponding to a predetermined range of the relative linear motion. The magnet is configured to produce a flow of magnet flux between diametrically opposing sides of the inner face, in a direction at right angles to the axis of rotation. The first magnetic sensor and second magnetic sensor produce respective first and second sensor signals, respectively expressing X direction and Y direction magnetic flux components, where the X direction and Y direction are oriented at right angles to one another and to the axis of rotation.

The processing circuitry derives the first calculation amount as the length of a magnetic flux vector, which is calculated as the mean square root of the magnetic flux values Bx and By (as expressed by the first and second sensor signals) and derives the second calculation amount as an angular value based on arctan By/Bx.

BRIEF DESCRIPTION OF THE DRAWINGS

FIG. 5 is a flow diagram of processing executed with by a first embodiment, based on the apparatus of FIG. 1, to derive a rotation angle from the magnetic flux detection signals;

FIG. 6 shows details of a step in the processing of FIG. 5;

FIGS. 8A, 8B are partial flow diagrams showing details of steps in the processing of FIG. 7;

DESCRIPTION OF PREFERRED EMBODIMENTS

First Embodiment

Figure 1:
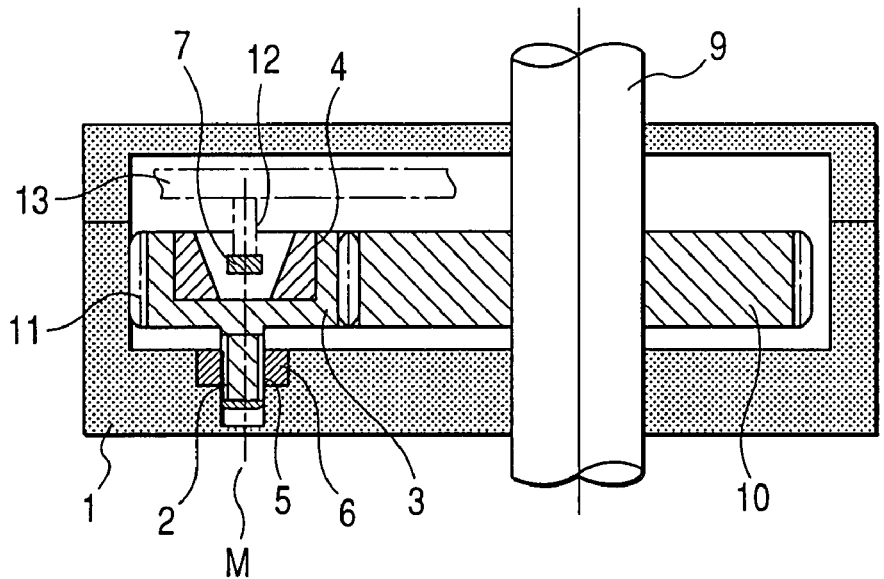
FIG. 1 is a conceptual cross-sectional view of an embodiment of a rotation angle detection apparatus, taken through the axis of a magnet rotor shaft.
Figure 2:
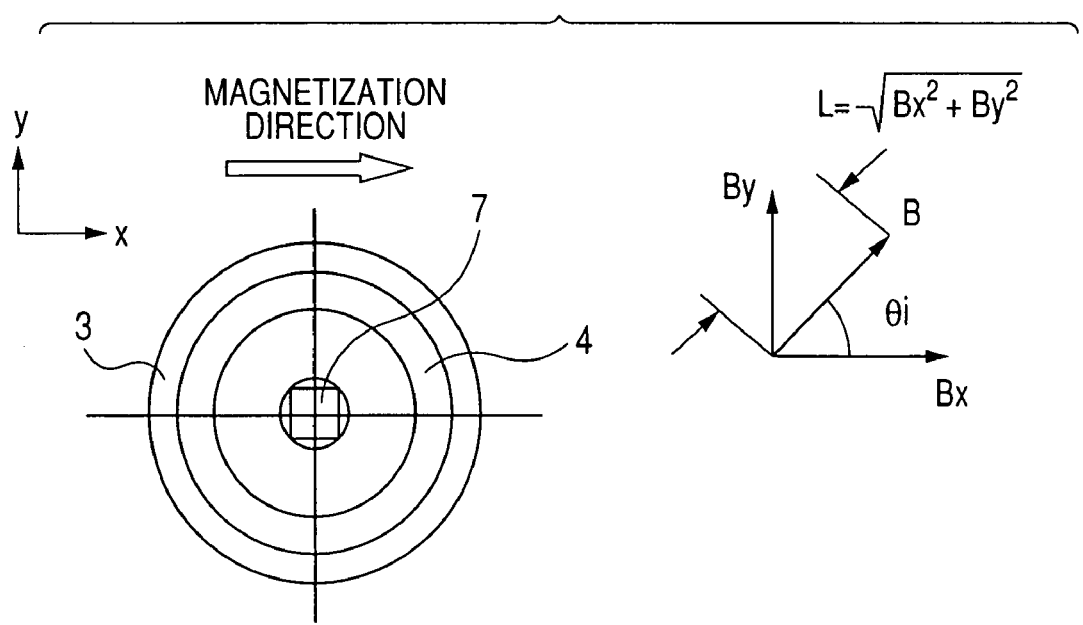
FIG. 2 is a plan view illustrating the configuration of a magnet and magnetic sensor section in the embodiment of FIG. 1.

FIG. 1 is a conceptual cross-sectional view showing the mechanical components of a first embodiment of a rotation angle detection apparatus. This mechanical configuration is common to each of respective embodiments described hereinafter. The configuration includes a rotatable yoke 3, with the cross-sectional view of FIG. 1 being taken in a plane that coincides with the axis of rotation of the yoke 3. FIG. 2 is a plan view of the yoke 3 and associated components.

The apparatus serves to detect amounts of angular rotation of a steering shaft 9 of a vehicle. More specifically, the apparatus measures a degrees of angular displacement of the steering shaft 9 from a reference angular position. However it will be understood that the apparatus would be equally applicable to detecting amounts of rotation angle of other types of rotary shaft which can be rotated through a limited number of rotations from a reference angular position.

The yoke 3 is fixedly attached to (or is integrally formed with) a magnet rotor shaft 2, having a circumferentially formed screw thread 5. A housing 1 which accommodates the yoke 3 and other components has a tapped member 6 fixedly attached therein, formed with a tapped hole having a screw thread corresponding to the screw thread 5, and with an aperture or cavity being formed in the housing 1 extending below the lower end of the tapped hole in the tapped member 6. The screw thread 5 of the yoke 3 engages in the hole in the tapped member 6, so that the yoke 3 is thereby rotatably supported within the housing 1 and is also moved along its axis of rotation as a result of being rotated.

The yoke 3 is shaped as a flange, and has a magnet 4 fixedly attached therein as shown. The magnet 4 is of basically annular form, but having an inner face with a circular circumference that is coaxial with the axis of rotation of the yoke 3, and which is tapered along the direction of the axis of rotation of the yoke 3, i.e. whose diameter successively increases along the axial direction (i.e., from a lower side to an upper side of the magnet 4, as viewed in FIG. 1).

A magnetic sensor unit 7 has is located within the circumference of the inner face of the yoke 3, fixedly retained at a position on a line that coincides with the axis of rotation of the yoke 3 (designated as the axis M), for detecting variations in magnetic flux density of the magnet 4 as it rotates. The magnetic sensor unit 7 is retained by a supporting rod 12, which is attached to a circuit board 13. The circuit board 13 is fixedly retained with respect to the housing 1, and contains a signal processing section 8 for processing output signals that are produced from the magnetic sensor unit 7, as described in detail hereinafter.

The external circumferential face of the yoke 3 is formed with gear teeth 11, which engage with the teeth of a gear wheel 10 that is fixedly mounted coaxially on the steering shaft 9.

In the following, the combination of tapped member 6 and the screw thread 5 of the magnet rotor shaft 2 will be referred to as the screw mechanism, which moves the yoke 3 along its axis of rotation. The combination of gear wheels 10 and 11 will be referred to as the gear mechanism. The gear ratio of the gear mechanism will be assumed to be 2:1, with this embodiment. The screw mechanism is configured such when the yoke 3 performs one complete rotation, it is displaced along the axial direction by a predetermined distance, e.g., 0.5 mm.

The magnet rotor shaft 2, the yoke 3, the magnet 4, the screw thread 5 and the gear wheel 11 will be collectively referred to as the magnet rotation assembly. The yoke 3 is formed of a magnetic material, and serves to increase the magnetic flux density of the magnet 4 at the locations of the magnetic sensors (described hereinafter) of the magnetic sensor unit 7, and also to provide a screen against intrusion of external magnetic fields to the magnetic sensor unit 7.

Designating a plane that is at right angles to the axis of rotation of the yoke 3 as the X-Y plane, with orthogonal X and Y directions of that plane being as illustrated in FIG. 2, the magnet 4 is magnetized along a single direction, parallel to that X-Y plane. Hence the yoke 3 may for example be rotated to a position in which the direction of magnetization is as shown in FIG. 2, i.e., such that the magnetic flux of the magnet 4 impinges on the magnetic sensor unit 7 along the X-direction. At any particular rotation angle of the magnet 4, the vector length of the magnetic flux density B can be expressed as a combination of an X-direction magnetic flux density component Bx and a Y-direction magnetic flux density component By, i.e., with the vector length being the mean square root of the values Bx and By, as illustrated in FIG. 2.

The magnetic sensor unit 7 includes a semiconductor chip which contains two Hall-effect sensor elements and buffer circuits. The buffer circuits receive the respective output signals from the Hall-effect sensor elements, and supply these to the signal processing section 8 as sensor signals Vx and Vy respectively. One of the Hall-effect sensor elements is located on the aforementioned axis of rotation M, oriented along the X-axis shown in FIG. 2, and serves to derive the sensor signal Vx whose voltage varies in accordance with the level of the X-direction magnetic flux density component Bx. The other Hall-effect sensor element is located on the axis of rotation M, oriented along the Y-axis shown in FIG. 2, and serves to derive the sensor signal Vy, whose voltage that varies in accordance with the level of the Y-direction magnetic flux density component By.

Figure 3:
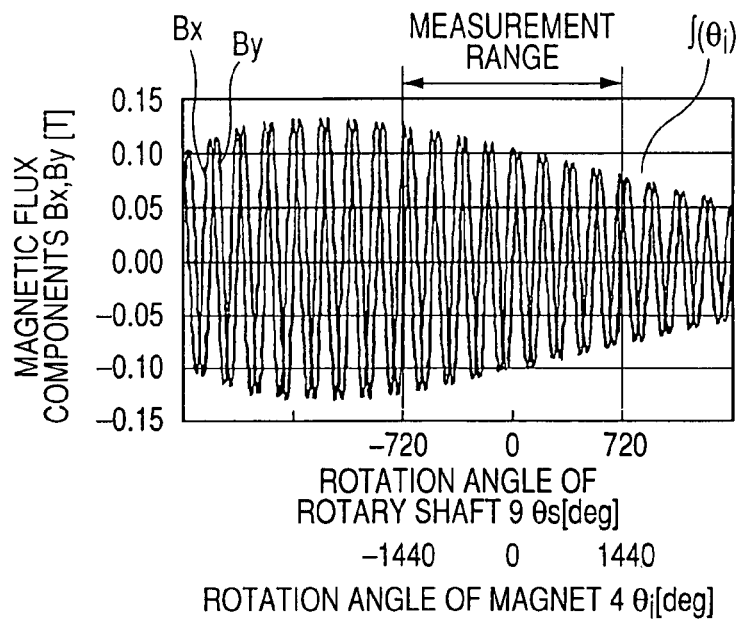
FIG. 3 is a timing diagram showing waveforms of X-direction and Y-direction magnet flux detection signals produced with the apparatus of FIG. 1.

FIG. 3 shows the waveforms of the sensor signals Vx and Vy. As shown in FIG. 3, with this embodiment it is assumed that the angular range for which measurement can be performed extends from $-720°$ to $+720°$ of rotation angle $\theta s$ of the steering shaft 9, i.e., two complete rotations of the steering shaft 9 in a first direction and two complete rotations in the reverse direction, from the reference 0° position. Hence, with the gear ratio between the gear wheel 10 and the yoke 3 being as described above, the complete angular range of measurement is from $-1440°$ to $+1440°$ of variation of the rotation angle of the magnet 4, which is designated in the following as the input angle $\theta i$.

Figure 12:
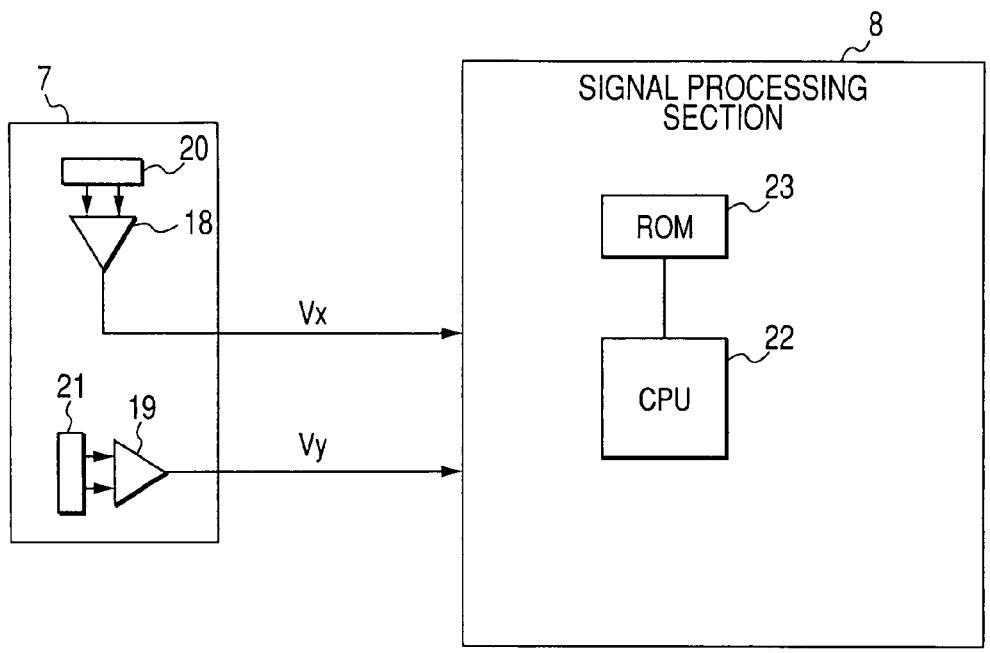
FIG. 12 is a general system block diagram showing the basic circuit configuration of the first embodiment; and, FIG. 13 is a general system block diagram showing the basic circuit configuration of the second and third embodiments.

The general circuit configuration of this embodiment is shown in the block diagram of FIG. 12. The X-direction and Y-direction Hall-effect sensor elements are respectively designated by numerals 20 and 21 and are coupled to respective buffer circuits 18 and 19, with a corresponding X-direction sensor signal Vx (whose voltage level expressing the magnitude of the X-direction magnetic flux density component Bx as described hereinabove) and Y-direction flux sensor signal Vy (whose voltage level expresses the magnitude of the Y-direction magnetic flux density component By) being thereby derived from the outputs of the elements 20, 21 respectively.

These signals Vx, Vy are inputted to the signal processing section 8, whose operation is based on a CPU (central processing unit) 22 which performs processing using data (values for constants used in calculations, etc.) that have been stored beforehand in a ROM (read-only memory) 23.

Calculation of Angular Values

The operations performed to calculate angular values with the following embodiments will be described in the following.

Due to the fact that the inner circumferential face of the magnet 4 is formed with a tapered shape along the axial direction, as described above and shown in the cross-sectional view of FIG. 1, when the magnet 4 is rotated in one direction, it becomes displaced in the downward direction (as viewed in FIG. 1) due to the action of the screw mechanism. This results in a reduction of the length of the magnetic vector of the magnetic flux density B that impinges on the magnetic sensor unit 7. Conversely when the magnet 4 is rotated in the opposite direction, it becomes displaced in the upward direction (as viewed in FIG. 1), thereby increasing the length of the magnetic vector.

Hence, with an X-direction and a Y-direction being respectively as defined hereinabove referring to FIG. 2, and the X-axis corresponding to the reference (0°) value of rotation angle of the magnet 4 (input rotation angle θ1), the magnitudes of the X-direction magnetic flux density component Bx and the Y-direction magnetic flux density component By acting on the magnetic sensor unit 7 are as follows:

$$Bx = f(\theta i) \cdot \cos \theta i$$

$$By = f(\theta i) \cdot \sin \theta i$$

Here, f(θi) is a function expressing the length of the magnet vector of the flux density B at the location of the magnetic sensor unit 7, with the vector length varying monotonically as the magnet 4 is displaced along the direction of its axis of rotation. The form of the function f(θi) depends upon such factors as the configuration of the magnet 4 and the yoke 3, the types of materials used to form these, etc. The value of the magnetic vector length is designated in the following as the first calculation amount θ1.

The ROM 23 of the signal processing section 8 has data stored therein beforehand which express f(θi), i.e., the relationship between respective (ideal) values of the first calculation amount θ1 and corresponding values of the input rotation angle θi, as described hereinafter.

It should be noted that the invention is not limited to the use of values of magnetic vector length as the first calculation amount θ1. It would be equally possible to derive some other parameter which varies monotonically as the input rotation angle varies over a requisite range of values.

The signal processing section 8 calculates the mean square root of the X-direction magnetic flux density component Bx and the Y-direction magnetic flux density component By as illustrated in FIG. 2 (more specifically, by operating on the values of the sensor signals Vx, Vy which respectively express the values of Bx and By), to obtain the vector length of the magnetic flux density B as the first calculation amount θ1.

The signal processing section 8 also performs processing to calculate the inverse tangent (arctan) of the ratio of the Y-direction magnetic flux density component By to the X-direction magnetic flux density component Bx (again, as represented by the respective values of the signals Vx, Vy), i.e.:

$$\theta 2 = \arctan (By/Bx)$$

To simplify the description, the values obtained for θ2 from the inverse tangent calculation are expressed in a range from −180° to +180°. θ2 will be referred to as the second calculation amount, and is used to specify the angular position of the magnet 4 within a range of less than 360°. The value of θ2 is zero (center of its range) when the input angle θi attains 0° or a multiple of 360°.

The measured rotation angle of the magnet 4 that is obtained by the apparatus is designated in the following as the output angular value θ0 (i.e., measured amount of rotation of the magnet 4 from the aforementioned reference 0° position). The corresponding rotation angle of the steering shaft 9 can be thereby obtained as θ0/2 with this embodiment.

Figure 4:
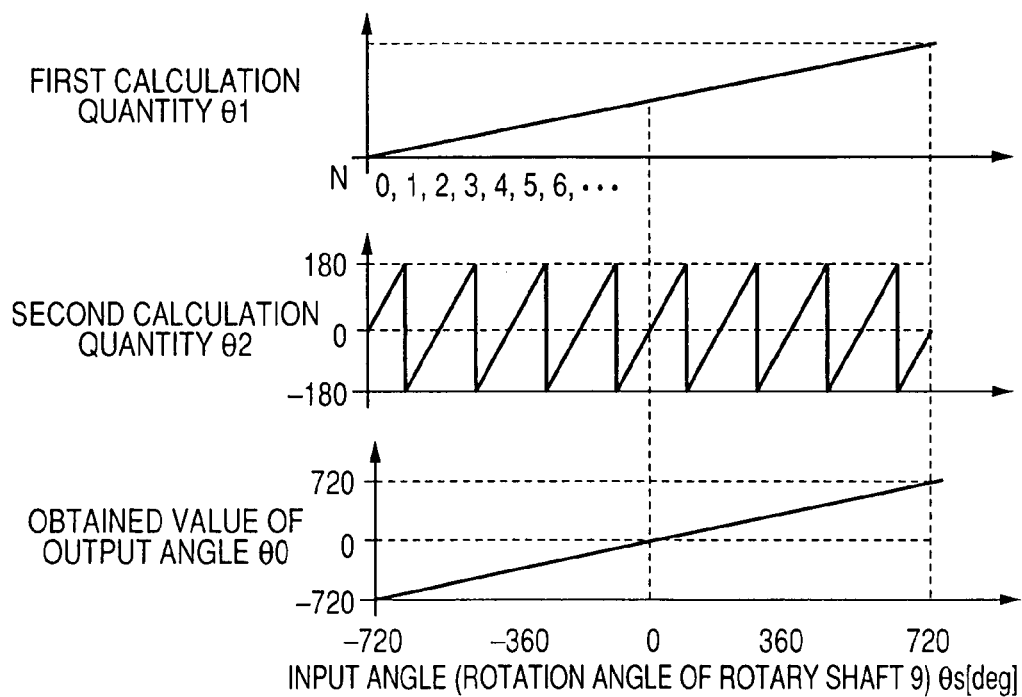
FIG. 4 illustrates relationships between rotation angles of the magnet in the apparatus of FIG. 1 and angular values derived based on the magnetic flux detection signals.

FIG. 4 graphically illustrates the relationships between values of the first calculation amount θ1 and number N of complete rotations of the magnet 4, between values of the second calculation amount θ2 and the input rotation angle θi, and between the output angular value θ0 and the input rotation angle θi. To simplify the drawing, only the central −720° to +720° range of θi is shown.

It will be assumed that with this embodiment, a range of values of the first calculation amount θ1 between 10 to 20 corresponds to the range from −720° to +720° of the input rotation angle θi, and that if θ1 is an ideal value θ1r (i.e., free from error), the following relationship is true:

$$\theta i = (\theta 1r - 15) \cdot 144$$

Hence if the apparatus derives an output rotation angle value θ0 which can be considered as accurately identical to the actual input rotation angle θi, then θ0 can be converted to the equivalent ideal value θ1r of the first calculation amount θ1, in the same units as θ1, by the scaling calculation:

$$\theta 1r = \theta 0 / 144 + 15$$

The relationship values (15, 144) for use in the above calculation are stored beforehand in the ROM 23, to be read out when required.

It will be understood that it would be equally possible to store values of θ1r and corresponding values of θi in a ROM beforehand, in the form of a data map, and to utilize the stored data to perform the above conversions.

With this embodiment as illustrated in FIG. 4, as the second calculation amount θ2 changes from its minimum (most negative) to maximum (most positive) value, the input angle θi changes by 180°. Designating "one variation period" of θ2 as a change from its minimum (−180°) to maximum (+180°) value, the number of variation periods of θ2 corresponding to a 360° change in the input angle θi will be designated in the following as k.

The amount of change in the first calculation amount θ1 that corresponds to one variation period of the second calculation amount θ2 will be designated as α. With this embodiment, the apparatus is configured such that for each value of the first calculation amount θ1 that is derived, the amount of deviation of θ1 (i.e., from the ideal value) is within the range −α/2 to +α/2. As a result the obtained value of θ1 can be used in conjunction with the angular rotation amount expressed by θ2 to accurately obtain a total number N of rotations of the magnet 4, i.e., successive 360° angular displacements from the central reference (0°) position in the −720° to +720° range. The output angular value θ0 can thereby be obtained by adding the angular value represented by N to the rotation amount represented by θ2 (i.e., θ2/k) to the result. (If θ2 were to be expressed as an arctan value in the range −90° to +90° then the rotation amount represented by θ2 would be θ2/k multiplied by 2).

Thus for example if the value of N is obtained as +1, and θ2 represents an angular value (rotation amount) of +55°, then the output value θ0 would be obtained as +415°.

The operation of the embodiment will be described more specifically referring to the flow diagram of FIG. 5, showing a processing routine that is repetitively executed by the signal processing section 8.

Firstly (step S100) the most recent values of the above-described sensor signals Vx, Vy are acquired, and the current values of the first calculation amount θ1 and second calculation amount θ2 are calculated based on the magnet flux levels expressed by the signals Vx, Vy (step S102).

The current values of θ1 and θ2 are then used to calculate the output angle θ (step S107). In the following, β is the value of the first calculation amount θ1 when the rotor 4 is at the aforementioned reference 0° position (central in the −720° to 720° range). This can be calculated from the aforementioned relationship between ideal values of θ1 and the rotation angle of the magnet 4, and stored beforehand in ROM.

Firstly, a value t is calculated as an integer value, by rounding off the digits below the decimal point in the result that is obtained from the following equation (1).

$$t = (\theta 1 - \beta)/\alpha - (\theta 2/360) + \frac{1}{2} \quad (1)$$

An accurate value of t is ensured if the amount of error in the first calculation amount θ1 does not exceed the above-described allowable limits (−α/2 to +α/2). The output angular value θ0 is then obtained from the following equation (2):

$$\theta 0 = (360 \cdot t + \theta 2)/k \quad (2)$$

As can be understood from the above, (t/k) is an integral number of rotations, and the output angular value θ0 is obtained by adding the rotation amount represented by (t/k) to that represented by θ2 (i.e., θ2/k). The contents of step S107 are shown in the partial flow diagram of FIG. 6.

The obtained value of output angle θ0 is then outputted (step S112).

It can thus be understood that with this embodiment, a magnet displacement mechanism is utilized to move a magnet along its axis of rotation as the magnet is rotated, and that the embodiment makes it possible to accurately detect rotation angles greater than 360° while using a magnet assembly in which only a single magnet is required to be rotated. Hence, the mechanical configuration can be simple, so that the apparatus can be made inexpensive to manufacture.

Second Embodiment

In the above description, it is assumed that the calculated value of the first calculation amount θ1 (derived based on detected value of magnetic flux) is utilized directly, in conjunction with the second calculation amount θ2, to obtain the output angular value θ0. However in practice, even if the amount of error in each calculated value of θ1 is initially within the aforementioned allowable range (−α/2 to +α/2), e.g., is within that range when the apparatus begins to be utilized, it is possible that the amount of error in the calculated values of θ1 may eventually come to exceed this range. This can be caused by factors such as gradual changes in the characteristics of circuit component, changes in operating temperature of the apparatus, etc.

A second embodiment will be described which eliminates this possibility, by applying compensation to each calculated value of θ1 such as to ensure that (if the initial value of error amount is within the aforementioned allowable range) any subsequent gradual increase in the error, even to an extent that exceeds the allowable range, will not adversely affect accurate calculation of the output rotation angle θ0.

Figure 13:
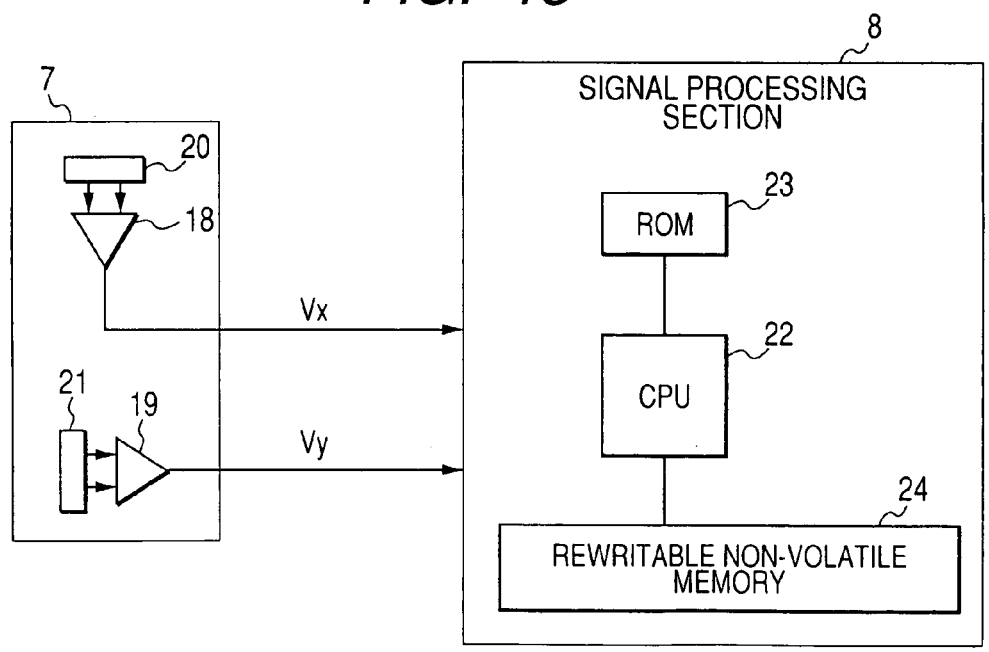

Other than in that compensation is applied for errors in the values of the first calculation amount θ1, with a rewritable non-volatile memory being additionally incorporated in the signal processing section 8 for that purpose, the second embodiment is configured and operates in a similar manner to the first embodiment described above. FIG. 13 is a general system block diagram of the second embodiment, with the rewritable non-volatile memory designated by reference numeral 24.

The processing executed by the signal processing section 8 of this embodiment will be described referring to the flow diagram of FIG. 7, which shows the basic operating sequence repetitively executed by the signal processing section 8.

Firstly, the most recent values of the X-direction magnetic flux component Bx and Y-direction magnetic flux component detected by the magnetic sensor unit 7, as expressed by the sensor signals Vx, Vy, are acquired (step S100). The respective values of the first calculation amount θ1 and the second calculation amount are then calculated as described hereinabove (step S102).

Next, the error amount Δθ corresponding to the value currently obtained for θ1 (which has been previously stored in a data map in the rewritable non-volatile memory 24, linked to that value of θ1) is read out from the rewritable non-volatile memory 24 (step S104). That error amount Δθ is then added to θ1 to obtain a compensated value of θ1, with that compensated value being designated as θ1' (step S108).

The output angular value θ0 (degree of rotation of the magnet 4 from the reference 0° center position in the −720° to +720° range) is then calculated using the equations (1) and (2) described above, in the same manner as described for the first embodiment, but with the compensated value θ1' being utilized in place of currently obtained value of θ1 (step S110).

In that way, compensation can be applied based upon the precedingly derived error amount Δθ that has been read out from the rewritable non-volatile memory 24, enabling the angular value θ0 to be accurately calculated. The obtained value θ0 is then outputted (step S112).

Next (step S114), the amount of error Δθ in the currently obtained (i.e., uncompensated) value of θ1 is calculated based on that value of θ1 and the calculated angular value θ0. This newly calculated error amount Δθ is then stored as an updated value in the data map in the rewritable non-volatile memory 24, linked to the currently obtained value of θ1 (step S116).

With this embodiment, if the amount of error of each of the possible values of θ1 (at the time of commencement of operation of the apparatus) does not exceed the aforementioned allowable limits (−α/2 to +α/2), then even if the amount of error corresponding to any specific value of the first calculation amount θ1 should subsequently come to exceed these limits, the stored error amount Δθ corresponding to that value of θ1 will have been previously updated accordingly. Hence, the output angular value θ0 can be accurately obtained, based on the compensated value θ1', even if the amount of error in the first calculation amount θ1 has increased to the extent that it exceeds the allowable limits.

Figure 7:
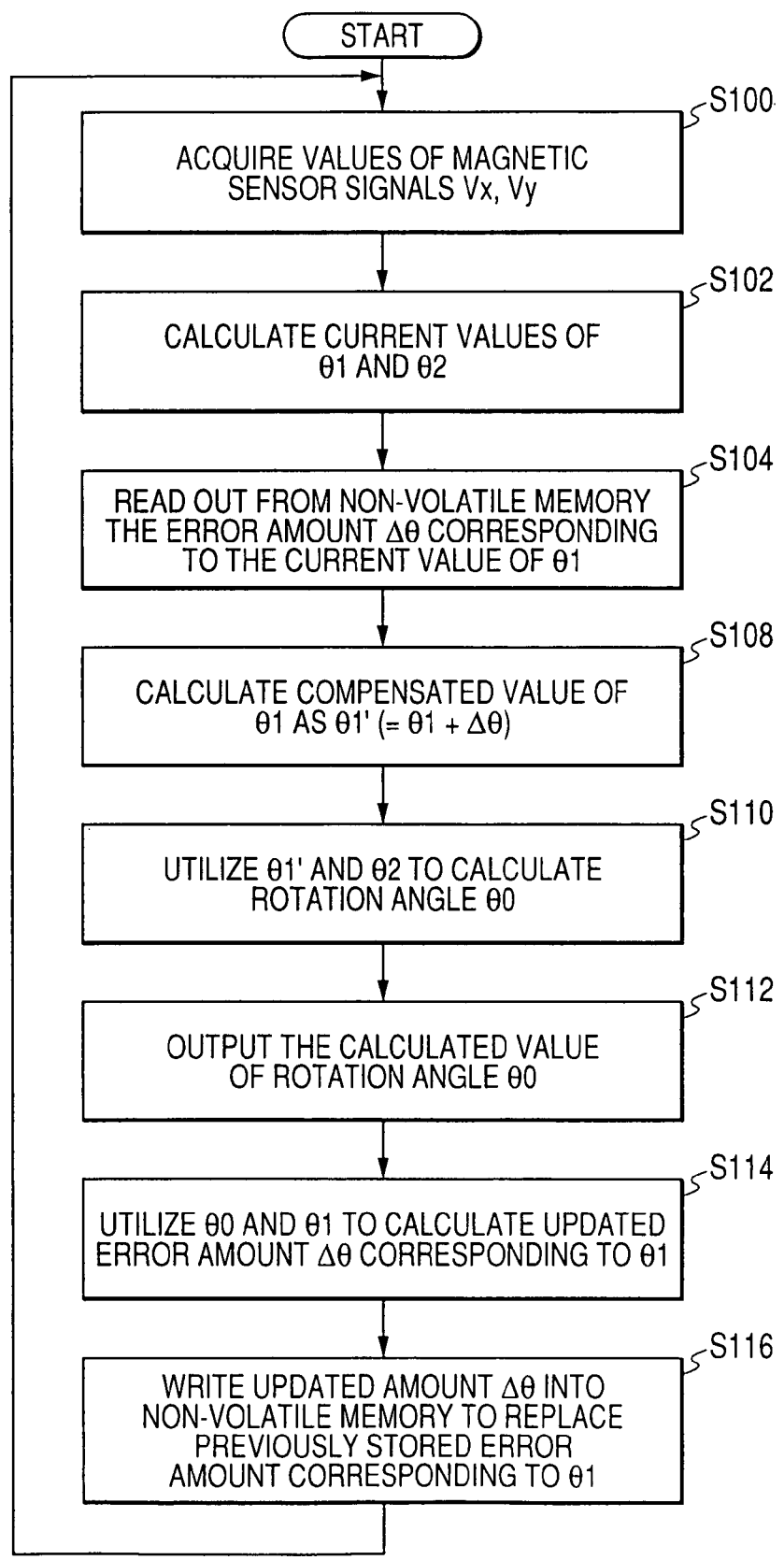
FIG. 7 is a flow diagram of processing executed with a second embodiment, to derive a rotation angle, utilizing a first form of error compensation.

FIG. 8A shows details of the contents of step S110 of the processing sequence of FIG. 7. Firstly, (step S110a) the values of the aforementioned constants β, α and k are read out from the rewritable non-volatile memory 24. Next (step S110b), these constants are utilized, together with the currently compensated value θ1' and the currently obtained value θ2, in the equations (1) and (2) described above (with θ1' being utilized instead of θ1), to calculate the output angular value θ0.

FIG. 8B shows details of the contents of step S114 of the processing sequence of FIG. 7. Firstly, (step S114a) the angular value that has been obtained for θ0 (i.e., a number within the range −760 to +760) is converted to a corresponding number within the range of values of θ1, i.e., is converted to a corresponding ideal value θ1r, by the scaling calculation described above. Next (step S114b), an updated error amount Δθ is obtained as the difference between θ1r and the currently obtained value of θ1.

Figure 9:
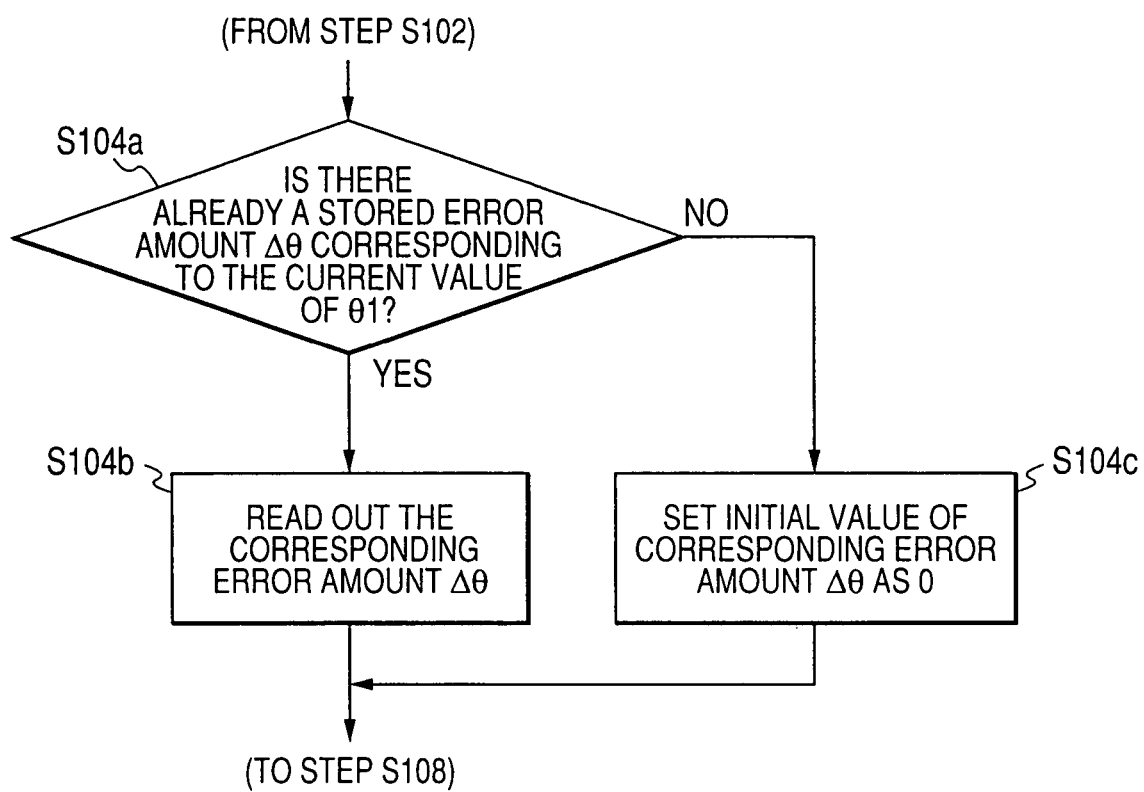
FIGS. 9 is a partial flow diagram showing details of a first alternative form of a step in the processing sequence of FIG. 7.

In the above, for simplicity of description, it has been assumed that on each occasion when step S104 of FIG. 7 is executed, a corresponding value of the error amount Δθ has previously been stored in the rewritable non-volatile memory 24 and so can be read out. However when the apparatus begins to initially operate, this will not yet be the case. FIG. 9 is a partial flow diagram showing details of the contents of step S104. Firstly, (step S104a) a decision is made as to whether a corresponding value of the error amount Δθ has previously been stored in the rewritable non-volatile memory 24. If there is a YES decision, then that corresponding value is read out (step S104b) and step S108 then executed. If there is a NO decision, then Δθ is set at a default value, e.g., zero (step S104c), before executing step S108.

Figure 10:
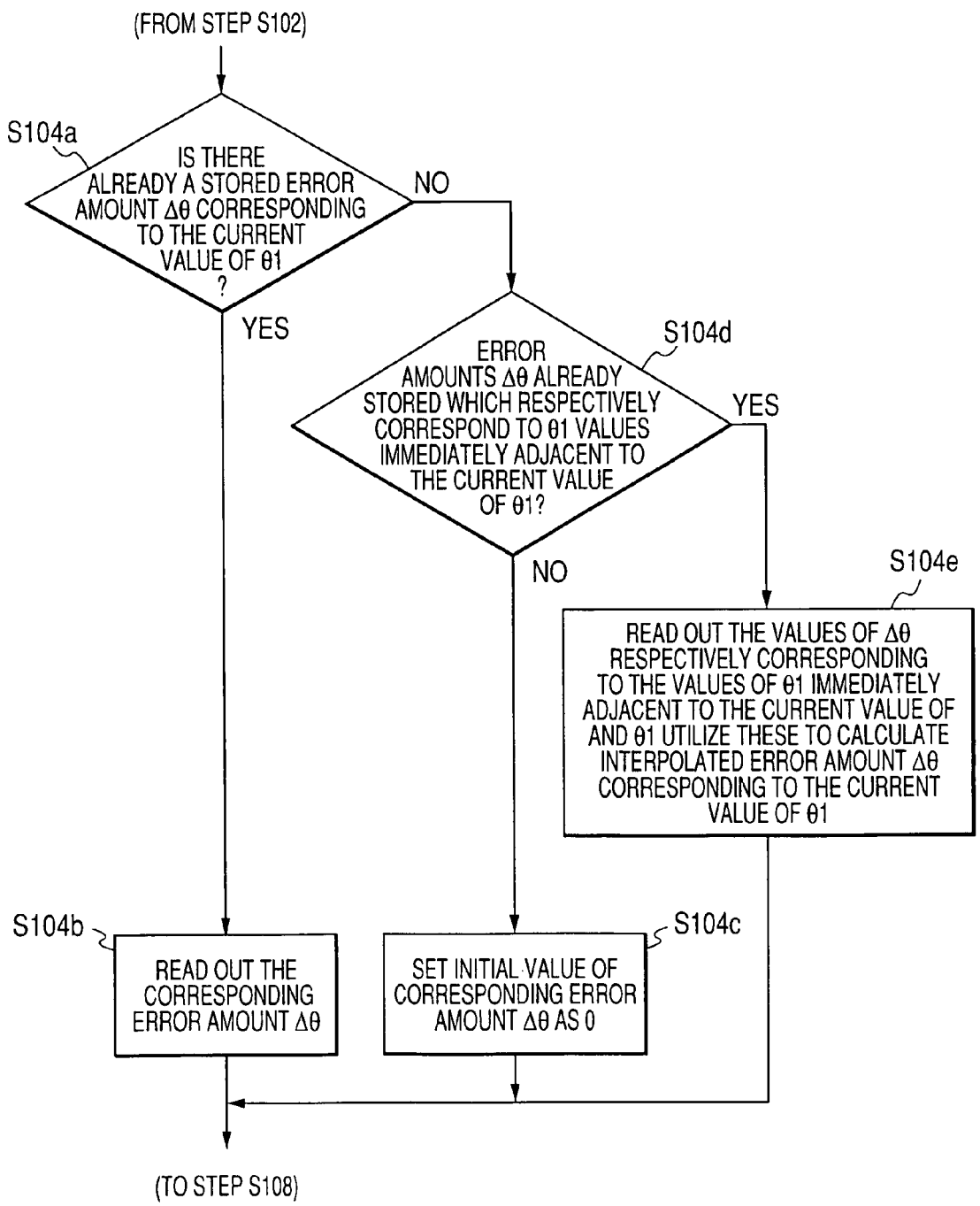
FIG. 10 shows details of a second alternative form of a step in the processing sequence of FIG. 7.

Alternatively, the contents of S104 can be as shown in the partial flow diagram of FIG. 10. In this case, if it is judged in step S104a that a corresponding value of the error Δθ has not yet been stored, then a decision is made (step S104d) as to whether values of error Δθ have already been stored which respectively correspond to the values of θ1 immediately adjacent to the currently obtained value of θ1. For example, if that currently obtained value of θ1 is 15 and assuming that the possible values of θ1 are limited to the discrete values 10, 11, 12, etc., a decision would be made as to whether values of error Δθ have already been stored which respectively correspond to the θ1 values 14 and 16.

If there is a YES decision, then step S104e is executed, in which a value of error Δθ corresponding to the currently obtained value of θ1 is calculated by interpolation of the Δθ values corresponding to the immediately adjacent values of θ1. That interpolated value is then utilized in step S108. If there is a NO decision in step S104d, then Δθ is set at a default value, e.g., zero (step S104c), before executing step S108.

With the above embodiment, the signal processing section 8 also performs processing (not shown in the drawings) whereby on the first occasion that an error amount Δθ is derived for a specific value of θ1 (in step S102), address locations for storing that value of θ1 and the corresponding error amount in the rewritable non-volatile memory 24 are assigned in the data map in the rewritable non-volatile memory 24, and information recording the address assignments is also stored in the rewritable non-volatile memory 24. In that way, information is available for use in executing step S104 of FIG. 7 as described above.

In the above description, the error amount Δθ is added to the obtained value of the first calculation amount θ1 to obtain the compensated value θ1' (e.g., in step S108 of FIG. 7). However it would be equally possible to express the error amount in the uncompensated value θ1 as an error ratio R, calculated as the ratio of the ideal value θ1r to the uncompensated value of θ1. In that case the error ratio R would be stored in the data map, linked to that corresponding value of θ1, in the same way as described for the error amount Δθ, and the compensated value θ1' would be calculated (e.g., in step S108 of FIG. 7) as the product (R.θ1).

Third Embodiment

With the compensation method of the second embodiment described above, each time the processing sequence is executed to acquire new values of the first calculation amount θ1 and second calculation amount θ2, a compensated value θ1' of the first calculation amount θ1 is derived, and used in calculating an updated value of the corresponding error amount Δθ. However in practice, if the error amount is below a predetermined threshold value for some values of θ1, it may be possible to omit the processing to calculate the compensated value θ1'.

Figure 11:
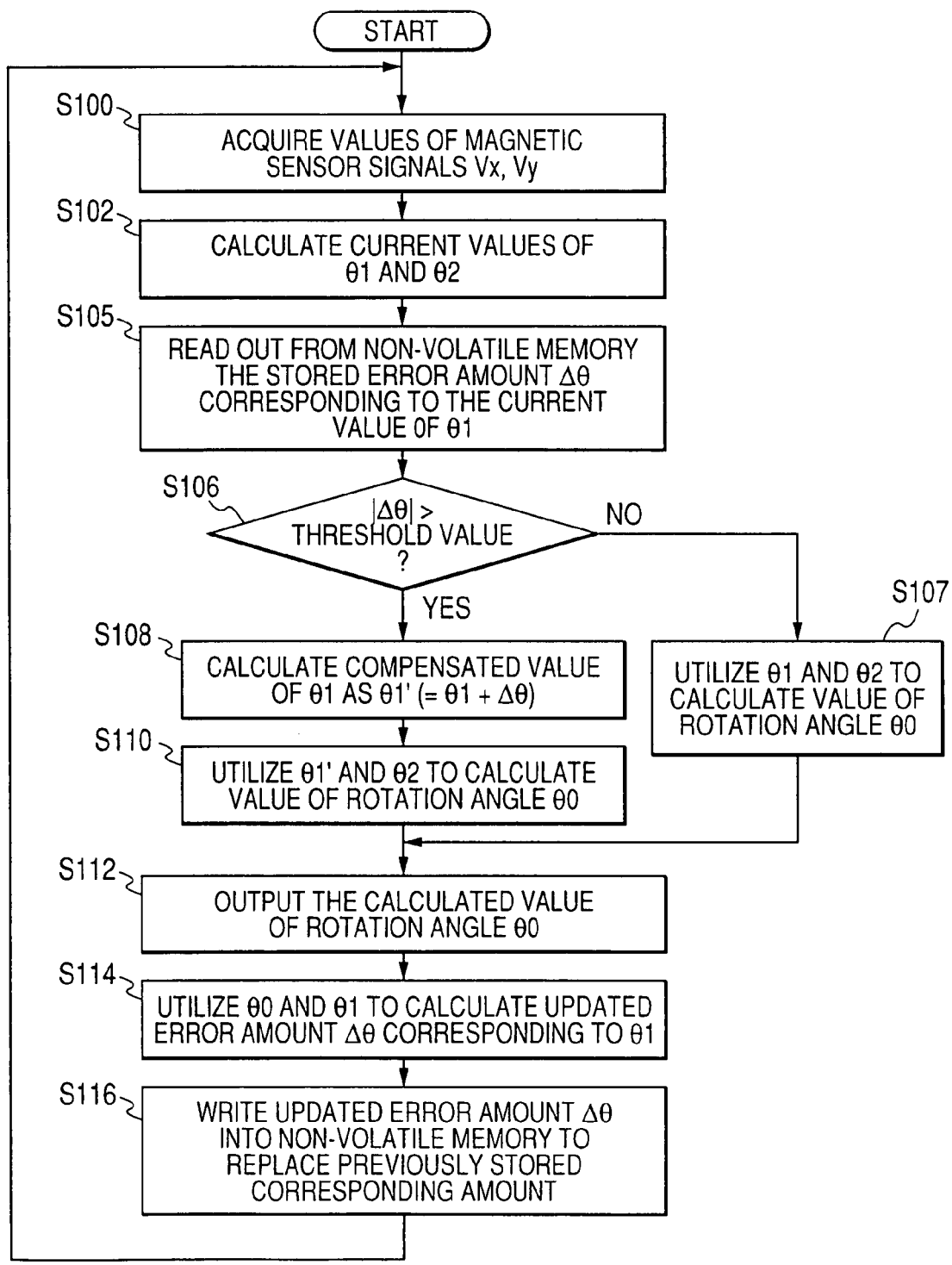
FIG. 11 is a flow diagram of processing executed by a third embodiment, to derive a rotation angle, utilizing a second form of error compensation.

FIG. 11 is a flow diagram of the processing executed by a third embodiment, which is a modified form of the second embodiment described above. As shown, this differs from the flow diagram of FIG. 7 for the second embodiment by the addition of:

(a) a judgement step S106 in which a decision is made as to whether the absolute magnitude of the (stored) error amount corresponding to the currently obtained value of θ1 exceeds the threshold value described above, and (b) a processing step S107 in which the value of the output angular value θ0 is calculated by using the currently obtained value of θ1 directly (as for the first embodiment) in conjunction with the second calculation amount θ2.

Only the features of difference from the processing of FIG. 7 will be described in the following.

With this embodiment, a decision is made in step S106 of FIG. 11 as to whether the absolute value of the corresponding previously stored error amount Δθ exceeds the predetermined threshold value. If the absolute value of Δθ exceeds the threshold value, then the processing of steps S108, S110 (described hereinabove for FIG. 7) is executed to calculate the output angular value θ0, using the compensated value θ1' of the first calculation amount θ1.

However if it is judged in S106 that the absolute value of the corresponding previously stored error amount Δθ does not exceed the predetermined threshold value, then step S107 is executed, in which the currently obtained value of the first calculation amount θ1 is used directly in calculating the output angular value θ0, as for the first embodiment.

In that way, it becomes possible to reduce the amount of calculation processing that must be executed by the signal processing section 8.

In the same way as described for the second embodiment, it would be possible to utilize an error ratio R in place of the error value Δθ with this embodiment. Alternatively, it would be equally possible to perform compensation of θ1 by applying a first stage of compensation that utilizes the error amount Δθ, then applying a second stage of compensation that utilizes the error ratio R.

It should be noted that the above-described principles of the respective embodiments are not limited in application to the specific apparatus configurations of the embodiments, but would be applicable to various other types of over-360° rotation angle detection apparatus in which an amount of rotation is measured based on derived values of a monotonically varying calculation amount (θ1) which can be used to specify an approximate value of the rotation amount within a range that exceeds 360° and a cyclically varying calculation amount (θ2) which can be used to specify a rotation amount within a range of less than 360°.

Moreover, various modifications to the described embodiments could be envisaged, which fall within the scope claimed for the invention in the appended claims.

What is claimed is:

1. A rotation angle detection apparatus for deriving a current value of shaft rotation angle of a rotary shaft within a range which exceeds 360°, said apparatus comprising:
a housing having said rotary shaft rotatably mounted therein, a magnet fixedly attached to said rotary shaft, a first magnetic sensor and a second magnetic sensor respectively fixedly mounted with respect to said housing and each located on an axis of rotation of said rotary shaft, for producing respective sensor signals varying in accordance with levels of magnetic flux flowing in directions at right angles to one another and at right angles to said axis of rotation, and
signal processing circuitry for processing said sensor signals;
said signal processing circuitry being configured to:
derive a current value of said first calculation amount and a current value of a second calculation amount based on respective values of said first sensor signal and second sensor signal, with said first calculation amount varying monotonically in a predetermined relationship to said shaft rotation angle throughout said range of values of said shaft rotation angle, said second calculation amount varying periodically between a minimum to a maximum value in accordance with successive increase of said shaft rotation angle, and with a predetermined integral number of variation periods of said second calculation amount occurring within a range of 360° variation in said shaft rotation angle, and
obtain said current value of the shaft rotation angle by a calculation utilizing said current values of the first calculation amount and second calculation amount.

2. A rotation angle detection apparatus as claimed in claim 1, wherein a maximum allowable error amount is predetermined for said derived values of the first calculation amount, with said error amount being a deviation of said first calculation amount from an ideal value which accurately represents said shaft rotation angle through said predetermined relationship.

3. A rotation angle detection apparatus as claimed in claim 2, wherein said allowable value is one half of an amount of change in said first calculation amount that corresponds to one variation period of said second calculation amount.

4. A rotation angle detection apparatus as claimed in claim 1, wherein designating said shaft rotation angle as θ, expressing first calculation amount as a function f(θ), and designating respective values of magnetic flux density expressed by said first sensor signal and second sensor signal as Bx and By, Bx is equal to the product of f(θ) multiplied by cos θ and By is equal to the product of f(θ) multiplied by sin θ.

5. A rotation angle detection apparatus as claimed in claim 4, wherein said magnet is configured to produce successively increasing values of magnetic flux at successively differing locations upon said axis of rotation, with said magnetic flux flowing in a direction at right angles to said axis of rotation, and wherein said apparatus comprises a mechanism configured to successively displace said first magnetic sensor and second magnetic sensor along said axis of rotation in accordance with variation of said shaft rotation angle.

6. A rotation angle detection apparatus as claimed in claim 5, wherein said signal processing circuitry is configured to derive said current value of the first calculation amount as a length of a vector of said magnetic flux, with said vector length being calculated as the square root of the mean square root of said magnetic flux values Bx and By as expressed by said first and second sensor signals, and
derive said current value of the second calculation amount as an angular value derived from the inverse tangent of the ratio of said magnet flux values By and Bx.

7. A rotation angle detection apparatus as claimed in claim 1 wherein said signal processing circuitry comprises a non-volatile memory for storing a plurality of values of a first calculation amount and a plurality of error amounts each linked to a corresponding one of said values of the first calculation amount, and is configured to repetitively execute a processing sequence comprising:
deriving a current value of said first calculation amount and a current value of a second calculation amount based on respective current values of said first sensor signal and second sensor signal,
reading out from said non-volatile memory a precedingly stored error amount corresponding to said current value of the first calculation amount;
calculating a compensated value of said first calculation amount, based upon said precedingly stored corresponding error amount;
calculating said current value of the shaft rotation angle based on said compensated value of said first calculation amount and said current value of said second calculation amount;
converting said calculated value of the shaft rotation angle to an ideal value of said first calculation amount, based on said predetermined relationship;
calculating an updated error amount based on said calculated ideal value and said current value of the shaft rotation angle; and
storing said updated error amount in said non-volatile memory to replace said precedingly stored corresponding error amount.

8. A rotation angle detection apparatus as claimed in claim 7, wherein said signal processing circuitry is configured to
judge whether an absolute value of said precedingly stored error amount exceeds a predetermined threshold value,
calculate said current value of the shaft rotation angle based on said compensated value of the first calculation amount and said current value of said second calculation amount, when said threshold value is judged to be exceeded by said absolute value, and
calculate said current value of the shaft rotation angle based on said current value of said first calculation amount and said current value of the second calculation amount, when said threshold value is judged to not be exceeded by said absolute value.

9. A rotation angle detection apparatus as claimed in claim 7, wherein said error amount is calculated as a difference between an ideal value of said first calculation amount and a current value of said first calculation amount.

10. A rotation angle detection apparatus as claimed in claim 7, wherein said error amount is calculated as a ratio of an ideal value of said first calculation amount to a current value of said first calculation amount.

11. A rotation angle detection apparatus for deriving a current value of shaft rotation angle of a rotary shaft from a reference angular position, within a range which exceeds 360°, wherein designating said shaft rotation angle as θ, said apparatus comprises means configured to derive a first calculation amount as a function f(θ) which varies monotonically throughout a range of values of said shaft rotation angle θ that exceeds 360°, and a second calculation amount which varies periodically between a minimum and a maximum value in accordance with variation of said shaft rotation angle, with a predetermined plurality of variation periods of said second calculation amount occurring within a variation range of 360° of said shaft rotation angle, and comprises processing circuitry configured to operate on respective current values of said first calculation amount and said second calculation amount, to calculate a current value of said shaft rotation angle θ;

wherein said apparatus is configured to operate with an absolute magnitude of an error amount in said first calculation amount being held to a value that is no greater than a predetermined allowable value.

12. A rotation angle detection apparatus as claimed in claim 11, wherein said allowable value is one half of an amount of change in said first calculation amount that corresponds to one variation period of said second calculation amount.

13. A rotation angle detection apparatus as claimed in claim 11, comprising a non-volatile memory for storing a plurality of values of said first calculation amounts and a plurality of error amounts each linked to a corresponding one of said values, wherein said processing circuitry is configured to periodically execute a processing sequence comprising:

acquiring respective current values of said first calculation amount and said second calculation amount;

reading out from said non-volatile memory a precedingly stored error amount that is linked to said current value of the first calculation amount;

calculating a compensated value of said first calculation amount, based upon said error amount;

calculating said current value of the shaft rotation angle based on said compensated value of said first calculation amount and said current value of said second calculation amount, calculating an updated value of said error amount based upon said current value of the first calculation amount and said current value of the shaft rotation angle; and storing said updated value of error amount in said non-volatile memory to replace said precedingly stored error amount.

14. A rotation angle detection apparatus according to claim 11, comprising a housing having said rotary shaft rotatably mounted therein, a magnet, and a pair of magnetic sensors, with one of said magnet and said pair of magnetic sensors being attached for rotation with said rotary shaft and the other being fixedly attached with respect to said housing and with said magnetic sensors being located upon an axis of rotation of said rotary shaft, and a mechanism for effecting relative linear motion between said magnet and said pair of magnetic sensors, with said motion directed along said axis of rotation and occurring in accordance with rotation of said rotary shaft, wherein said magnet is configured with an inner face having a circular circumference which is concentric with said axis of rotation and which successively increases in diameter throughout an axial distance corresponding to a predetermined range of said relative linear motion, and said magnet is configured to produce a flow of magnet flux between diametrically opposing sides of said inner face, in a direction at right angles to said axis of rotation, said first magnetic sensor and second magnetic sensor are configured to produce respective first and second sensor signals, respectively expressing X direction and Y direction magnetic flux components, where said X direction and Y direction are oriented at right angles to one another and to said axis of rotation, and wherein said processing circuitry is configured to obtain said first calculation amount as a length of a vector of said magnetic flux, with said vector length being calculated as the mean square root of said magnetic flux values Bx and By as expressed by said first and second sensor signals, and obtain said second calculation amount as an angular value derived from the inverse tangent of the ratio of said magnetic flux values By and Bx.

* * * * *

UNITED STATES PATENT AND TRADEMARK OFFICE
CERTIFICATE OF CORRECTION

PATENT NO. : 7,420,363 B2  
APPLICATION NO. : 11/797424  
DATED : September 2, 2008  
INVENTOR(S) : Hatanaka et al.

Page 1 of 1

It is certified that error appears in the above-identified patent and that said Letters Patent is hereby corrected as shown below:

On the title page, under (73) Assignee, include the second assignee as follows:

Nippon Soken, Inc.,
Nishio-city, Aichi-pref. (JP)

Signed and Sealed this

Thirtieth Day of December, 2008

JON W. DUDAS
*Director of the United States Patent and Trademark Office*